United States Patent [19]

Fasano

[11] 4,318,153

[45] Mar. 2, 1982

[54] SNEAK CURRENT FUSE FOR TELEPHONE CIRCUITS

[75] Inventor: Michael Fasano, Syosset, N.Y.

[73] Assignee: Porta Systems Corp., Syosset, N.Y.

[21] Appl. No.: 157,360

[22] Filed: Jun. 9, 1980

[51] Int. Cl.³ .................... H02H 3/22

[52] U.S. Cl. .................... 361/119; 361/124

[58] Field of Search .................... 361/119, 120, 124, 125

[56] References Cited

U.S. PATENT DOCUMENTS 4,004,192 1/1977 Carney .................... 361/119 X 4,051,546 9/1977 Scheithauer .................... 361/124

*Primary Examiner*—Harry E. Moose, Jr.

*Attorney, Agent, or Firm*—Charles E. Temko

[57] ABSTRACT

An improved telephone protector module for individual subscriber circuits incorporating, in addition to heat sensitive means for grounding outside plant tip and ring currents, switch means for simultaneously opening the tip and ring circuits leading to central office or PBX equipment when excessive current is detected. The switch means is normally in closed position when the heat sensitive means is in unfired condition.

3 Claims, 5 Drawing Figures

SNEAK CURRENT FUSE FOR TELEPHONE CIRCUITS

BACKGROUND OF THE INVENTION

This invention relates generally to the field of telephony, and more particularly to improved telephone protector module construction for use with individual subscriber circuits used to protect central office equipment from damage caused by the transmission of excessive current surges. Devices of this general type are known in the art, and the invention lies in specific constructional details which provide an additional function of the module with the firing of a heat-sensitive device incorporated therein.

Protective modules of known type are placed on telephone office main frames, and when connected in series with a subscriber line serve to ground the line upon the occurrence of excessive current surges, such as results from lightning strikes, contact with fallen power cables and the like. While some modules, particularly those used in rural areas often employ carbon electrodes or a gas tube in the absence of other protective components, more sophisticated modules employ some kind of heat sensor or heat coil which will melt a solder pellet or solder seal upon the occurrence of continuous excessive current. When the solder melts, a resiliently urged member moves to establish a permanent short to ground, thereby protecting the office equipment.

In the case of most conventional equipment, such protection has proven adequate. However, in recent years, there has been a substantial amount of privately owned equipment installed in shaftways in tall buildings, in which the danger of fire is ever present. That portion of a protective circuit disposed within the building can be accidentally damaged by repair or alteration of the building interior, and other causes beyond the control of the telephone company. It is desirable that such part of the circuit be placed in non-conductive condition upon the occurance of an excess current surge rather than merely grounded.

SUMMARY OF THE INVENTION

Briefly stated, the invention contemplates the provision, in a known type heat sensitive protector module of a simple switch which is normally closed, and which is moved to open condition when the heat sensitive device fires. That portion of the circuit leading to the subscriber equipment is thereby opened, simultaneously with the grounding of that part of the circuit leading outward of the building. The switch consists of first and second conductive members separated by a third non-conductive annular member, the three members being aligned with the normally present coil spring which serves to fire the heat sensitive device. One of the conductive members forming the switch includes a resilient component which is pressed against the other conductive member by the presence of a portion of the heat sensitive device when in unfired condition. When the heat sensitive device is fired, the resilient component springs out of contact with the second conductive member, thereby opening that part of the associated tip or ring circuit.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
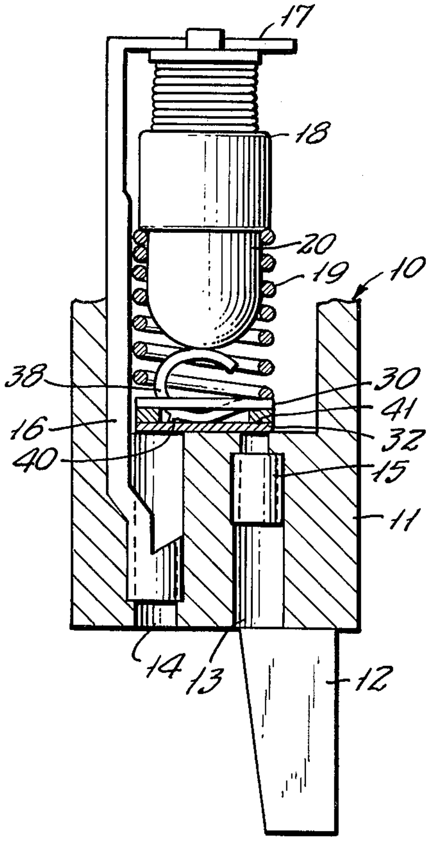
FIG. 1 is a fragmentary longitudinal sectional view of a protector module embodying the invention, in normal condition.

Referring to FIG. 1 in the drawing, FIG. 10 indicates generally a protective module of generally known type including an outer housing 11, a grounding prong 12, and first and second sockets 13–14 adapted to engage corresponding prongs on a telephone connector block (not shown). The socket 13 mounts a short conductor 15, while the socket 14 mounts a long conductor 16 terminating in a plane 17 for contact with carbons or gas tube, as is well known in the art. A heat sensitive device 18 includes a resilient coil spring 19 which surrounds an insulative member 20.

Figure 2:
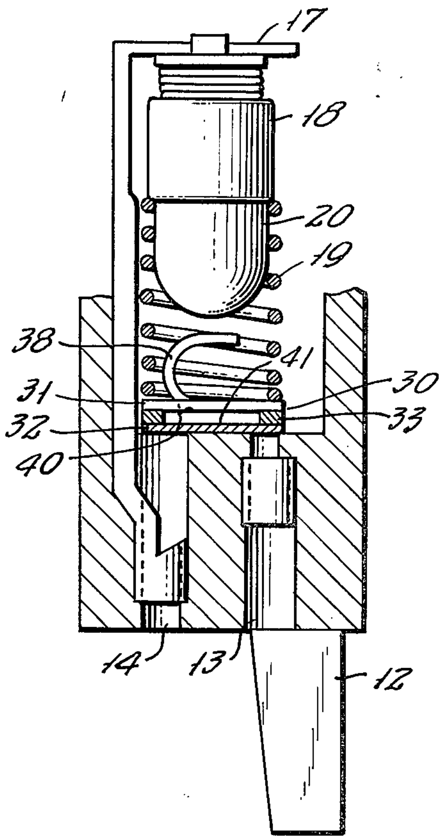
FIG. 2 is a similar sectional view thereof showing the relative positions of the component parts after the firing of a heat sensitive component.
Figure 3:
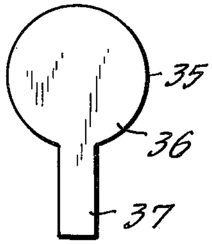
FIG. 3 is a view in elevation showing a blank used to form one part of a switch component comprising a part of the embodiment.

As seen in FIG. 2, upon the occurrence of a continued surge of excess current, the heat sensitive device 18 fires, at which time the coil spring 19 urges the member 20 upwardly as seen in FIG. 2 which movement causes a shorting of the incoming tip or ring circuit to a source of ground potential in a manner known in the art. When this occurs, the bulk of the excess current is immediately dissipated, but in such construction, the respective tip or ring circuit is still connected to the office switching equipment. Should the excess current flow be caused by an event occurring at the protected station, current continues to flow within that portion of the circuit beyond the station protector, with the possibility of occurrence of a fire within the building.

To avoid this problem, there is provided in the disclosed embodiment a protective switch 30 comprising first and second conductive members 31–32 which are separated by an insulative annular member 33. The switch 30 is positioned coaxially with respect to the coil spring 19, and is positioned between the inner end of the spring and the inner ends of the sockets 14 and 15.

Figure 4:
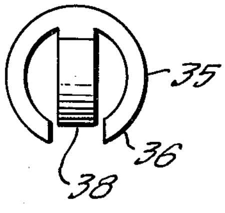
FIG. 4 is a view in elevation showing a completed switch component formed from the blank shown in FIG. 3.
Figure 5:
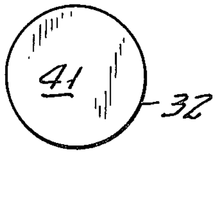
FIG. 5 is a view in elevation showing a second component of the switch.

Referring to FIG. 4, the first conductive member 31 may be conveniently formed from a flat stamping 35 including a circular member 36 and an elongated tongue 37. The tongue 37 is bent to form a U-shaped loop 38 (FIGS. 1 and 2), a free end of which overlies the cap-like insulative member 20. A small contact 40 is punched from the body of the tongue 37 during manufacture, and when the heat sensitive device 18 is in unfired condition, the end of the member 20 moves the loop 38 downwardly so that the contact 40 contacts an adjacent surface 41 of the second conductive member 32. Current is thus transmitted through the member 32 to the barrel socket 15.

Upon the firing of the heat sensitive device 18, the spring 19 urges the member 20 upwardly to the position shown in FIG. 2, thus relieving the pressure exerted upon the loop 38, and allowing it to expand while returning to unstressed condition. In this condition the contact 40 parts contact with the surface 41, thus opening the switch and preventing the flow of current to the socket 15. At this point, no current flows through the module to the station equipment, until the excess current surge has been removed and the module replaced.

We wish it to be understood that we do not consider the invention limited to the precise details of structure shown and set forth in this specification, for obvious modifications will occur to those skilled in the art to which the invention pertains.

We claim:

1. In a telephone protector module, including a housing and conductive terminals for interconnecting tip and ring circuits from an individual subscriber station to telephone office equipment, said module having heat sensitive means for grounding said tip and ring circuits upon the occurrence of a continuous excess current surge, the improvement comprising: switch means interconnecting said conductive terminals and said heat sensitive means, and controlled by said heat sensitive means such that said switch is normally closed to provide continuity when said heat sensitive means is in unfired condition, the firing of said heat sensitive means serving to open that portion of a respective tip or ring circuit leading to station equipment, while simultaneously grounding that portion of said respective circuit leading to telephone office equipment.

2. The improvement in accordance with claim 1, further characterized in said heat sensitive means including a coil spring and an insulative member, the position of which is displaced under the action of said spring, when said heat sensitive means is fired, said switch including a pair of conductive members separated by a second insulative member, and positioned beneath said spring and said first mentioned insulative member, one of said pair of conductor members having a resilient component, portions of which contact said second of said pair of conductive members, and said first mentioned insulative member.

3. The improvement as set forth in claim 2, further characterized in said first of said pair of conductor members including a flexible loop shiftable along an axis concentric with the axis of said coil spring.

* * * * *